US009525668B2

(12) United States Patent
Bhargav-Spantzel et al.

(10) Patent No.: US 9,525,668 B2
(45) Date of Patent: Dec. 20, 2016

(54) FACE BASED SECURE MESSAGING

(71) Applicant: Intel Corporation, Santa Clara, CA (US)

(72) Inventors: Abhilasha Bhargav-Spantzel, Santa Clara, CA (US); Ned M. Smith, Hillsboro, OR (US); Hormuzd M. Khosravi, Portland, OR (US); Ulhas S. Warrier, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 78 days.

(21) Appl. No.: 14/317,225

(22) Filed: Jun. 27, 2014

(65) Prior Publication Data

US 2015/0381575 A1    Dec. 31, 2015

(51) Int. Cl.
*H04L 29/06*    (2006.01)
*H04L 9/14*    (2006.01)

(52) U.S. Cl.
CPC ............. *H04L 63/0428* (2013.01); *H04L 9/14* (2013.01); *H04L 63/0861* (2013.01); *H04L 2209/24* (2013.01)

(58) Field of Classification Search
None
See application file for complete search history.

(56) References Cited

U.S. PATENT DOCUMENTS

| 5,539,826 A * | 7/1996 | Dwork | G06F 21/305 380/30 |
| 6,819,219 B1 | 11/2004 | Bolle et al. | |
| 8,325,994 B2 * | 12/2012 | Davida | G06F 21/32 340/5.53 |
| 8,494,576 B1 * | 7/2013 | Bye | G07C 9/00087 455/403 |
| 8,713,704 B2 * | 4/2014 | Davis | H04L 9/3231 713/166 |
| 9,172,699 B1 * | 10/2015 | Vazquez | H04L 63/0861 |
| 2002/0116508 A1 * | 8/2002 | Khan | H04L 12/587 709/229 |

(Continued)

FOREIGN PATENT DOCUMENTS

| EP | 1152592 | 11/2001 |
| TW | I236634 | 7/2005 |

(Continued)

OTHER PUBLICATIONS

Smith, Ned et al., "Virally Distributable Trusted Messaging," U.S. Appl. No. 14/473,308, filed Aug. 29, 2014, 55 pages.

(Continued)

*Primary Examiner* — Farid Homayounmehr
*Assistant Examiner* — Maung Lwin
(74) *Attorney, Agent, or Firm* — Trop, Pruner & Hu, P.C.

(57) ABSTRACT

In an embodiment, a system includes at least one core and a trusted execution environment (TEE) to conduct an identity authentication that includes a comparison of streamed video data with previously recorded image data. Responsive to establishment of a match of the streamed video data to the previously recorded image data via the comparison, the TEE is to generate an identity attestation that indicates the match. Other embodiments are described and claimed.

14 Claims, 7 Drawing Sheets

(56) References Cited

U.S. PATENT DOCUMENTS

| | | | |
|---|---|---|---|
| 2004/0158724 A1* | 8/2004 | Carr | B42D 25/00 713/186 |
| 2004/0162988 A1* | 8/2004 | Harper | G06F 19/323 713/186 |
| 2006/0069922 A1* | 3/2006 | Jelinek | H04L 63/0823 713/186 |
| 2006/0110011 A1* | 5/2006 | Cohen | G06F 21/121 382/115 |
| 2006/0206724 A1* | 9/2006 | Schaufele | G06F 21/32 713/186 |
| 2007/0106895 A1* | 5/2007 | Huang | H04L 9/0866 713/170 |
| 2007/0198286 A1* | 8/2007 | Tomita | G06F 21/32 713/182 |
| 2007/0245157 A1* | 10/2007 | Giobbi | G06F 21/31 713/186 |
| 2010/0023755 A1* | 1/2010 | Kotani | G06F 21/33 713/156 |
| 2010/0023768 A1* | 1/2010 | Lin | H04W 12/06 713/171 |
| 2013/0015946 A1* | 1/2013 | Lau | G07C 9/00 340/5.2 |
| 2013/0218721 A1* | 8/2013 | Borhan | G06Q 30/0207 705/26.41 |
| 2013/0251216 A1* | 9/2013 | Smowton | H04L 9/3231 382/118 |
| 2013/0278622 A1 | 10/2013 | Sun et al. | |
| 2013/0305059 A1* | 11/2013 | Gormley | G07F 7/08 713/189 |
| 2013/0342689 A1* | 12/2013 | Sanjay | H04N 7/183 348/143 |
| 2014/0096182 A1 | 4/2014 | Smith | |
| 2015/0135258 A1 | 5/2015 | Smith | |

FOREIGN PATENT DOCUMENTS

| | | |
|---|---|---|
| WO | 01-86599 | 11/2001 |
| WO | 2005-018139 | 2/2005 |

OTHER PUBLICATIONS

Pate, Steve, "Intel SGX Holds a lot of Promise for Secure Cloud Computing," HyTrust Article, Mar. 19, 2014, 4 pages.

International Searching Authority, "Notification of Transmittal of the International Search Report and the Mitten Opinion of the International Searching Authority," mailed Oct. 6, 2015 in International application No. PCT/US2015/038118.

Taiwan Intellectual Property Office, Official Letter mailed Mar. 14, 2016 in Taiwan Patent Office No. 104116675. (Translation Redacted).

* cited by examiner

FACE BASED SECURE MESSAGING

TECHNICAL FIELD

Embodiments pertain to face based secure messaging.

BACKGROUND

In today's world, pictures of people's faces are universal. At any given second, there are about 500 billion to 1 trillion photos available online. Photos are taken in numerous consumer lifestyle settings and also for businesses and services. However these photos are not useful as a mechanism for a remote sender to securely transmit confidential messages to an individual whose photograph is available to the sender because there is no trustworthy mechanism that enforces identity verification and enforces secure message delivery policies.

DETAILED DESCRIPTION

Techniques are described to confirm a user's identity through use of photographic data, for secure transmission of confidential data/messages. Techniques employed include a combination of client system attestation, trusted execution environment (TEE), and verification of the user based on facial data and other factor recognition (e.g., multi-factor authentication) to establish a secure connection between a sender and a receiver. Authentication may be performed by the client system because of the TEE. Further, the client system can provide proof of compliance and enforcement of policies specified by the sender in order to receive one or more private keys to decrypt secure messages sent to the receiver. Proof of compliance and enforcement of policies may correspond to a zero knowledge proof (ZKP), which allows the receiver to prove that secure message access conditions are met without sending additional information from the receiver to the sender.

Figure 1:
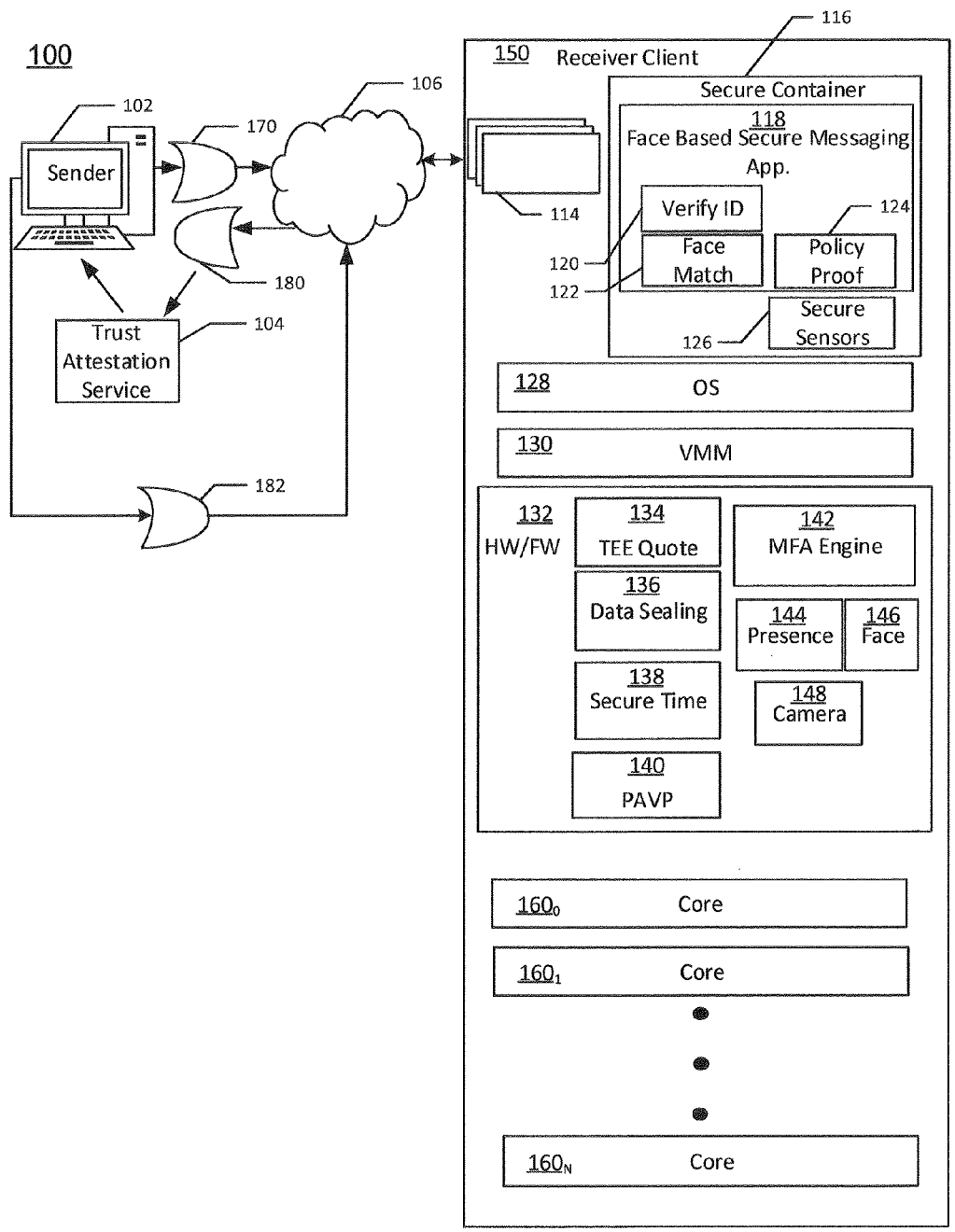
FIG. 1 is a block diagram of a system to transfer messages securely, according to embodiments of the present invention.

FIG. 1 is a block diagram of a system to transfer messages securely, according to embodiments of the present invention. The system 100 includes a sender 102 (e.g., a computational device, a server, etc.), a trust attestation service 104, and a receiver 150. The receiver 150 includes one or more cores $160_0$-$160_N$, one or more applications 114, an operating system 128, a virtual machine manager (VMM) 130, a secure container 116 and secure hardware/firmware 132. The secure container 116 and the secure hardware/firmware 132 are included in a trusted execution environment (TEE).

In operation, the sender 102 generates a message to be sent to the receiver 150, e.g., via Internet cloud 106. The message may be encrypted, e.g., via a symmetric key, a private key, or other encryption technique. The sender creates a face-based secure messaging (FSM) request 170 that includes four components: 1) a receiver picture (e.g., photographic information); 2) Policy_M (Pol_M), a sender-defined policy to access the message; 3) enc_M, the encrypted message; and 4) Key_Com1, a public key of the sender. Policy_M may include policies such as receiver client system attestation requirements, private message use obligations (e.g., use of a specified face recognition application with a given threshold match), private message use restrictions (e.g., time restrictions, such as decrypted message is not visible for more than N minutes, where N is specified by the sender), and other sender-defined policies.

An FSM application 118, running in the secure container 116 of the TEE, receives the FSM request 170 and begins to verify user identity. Requirements for user authentication and presence detection may be specified in Pol_M. User authentication may include multi-factor analysis, conducted by, e.g., multi-factor analysis (MFA) engine 142), and based on data that may include, e.g., fingerprint(s), recorded voice, other biometric data, etc.

Included in a presence detection procedure is data collection of video of a user (e.g., a live data sample of streamed video data) collected by a camera 148. In some embodiments, the camera 148 (as shown in FIG. 1) is within the TEE hardware/firmware 132. In other embodiments (not shown), a camera may be located outside of the TEE hardware/firmware 132, and the TEE establishes a trusted-path connection (e.g., defined by Pol_M) between the FSM application 118 and the camera. The FSM application 114 is considered trustworthy to do the live data collection and a liveness detection.

A presence detection logic 144 can detect a likelihood that a user is in close proximity to the camera 148. In one embodiment, the presence detection logic 144 detects a cell phone (e.g., Bluetooth, wearable phone, etc.) in close proximity to the camera 148. A hardware/firmware face authentication module 146, in conjunction with face recognition software 122, conducts a comparison to the receiver picture. A match of the live video data to the receiver picture may be judged based on, e.g., a threshold policy as defined in Pol_M, e.g., 70% match of various biometric facial features (e.g., distances between eyes, distances between nose and eyes, and other facial biometrics), or other match criteria.

The TEE, executing the FSM application 118, then creates, e.g., in TEE quote logic 134, a receiver system attestation quote (Quote_Rec), which is a signed binary large object (blob) that includes a result of receiver client attestation, e.g., attestation established by ID verification logic 120, e.g., using results of the multi-factor analysis (MFA) engine 142 and face recognition logic (e.g., face recognition software 122 working in conjunction with the firmware face authentication module 146). The TEE also creates, via policy proof logic 124, a proof of compliance with Pol_M, the sender-defined policy for message access. The proof of compliance indicates compliance with the Pol_M policy of the sender. In some embodiments, the proof of compliance also indicates that no additional information other than authentication/attestation is sent to the sender (e.g., "zero knowledge" proof of compliance, ZKProof_Rec).

The TEE encrypts the FSM Response with Key_Com1 and sends encrypted FSM Response 180 including Key_Com2 (the public key of the receiver) to the sender, e.g., via the cloud 106.

The sender 102 may employ a trust attestation service 104 to verify the attestation quote and the proof of compliance. Upon verification of the attestation quote and the proof of compliance, the sender encrypts the private key (Key_M) with the public key of the receiver (Key_Com2) and sends an encrypted Key_M 182 to the receiver client 150, e.g., via the cloud 106. The FSM application 118 decrypts the encrypted Key_M 182 and uses the Key_M to decrypt the message Enc_M. The FSM application 118 enforces the message use policy defined in Pol_M. The Pol_M policy can be enforced using TEE services such as data sealing 136 (e.g., binding of data to a configuration instance of a trusted execution environment using a cryptographic key), secure time 138 for time based policies, face authentication logic 146 in combination with facial recognition software 122 (e.g., the facial recognition software 122 may have access to a database of reference templates and other data about a user community), presence detection logic 144, protected audio visual path (PAVP) 140 (e.g., protected audio visual pipeline to secure graphics media—in some embodiments, raw video data frames may be encrypted enroute to the face authentication logic 146), etc.

As an example of a use of the system 100, consider a bank called SecureBank that has customers who may be residing in all parts of the world. Alice is one such customer. Alice is asked to enroll in person so that several identity details are verified and a picture is taken for reference. Alice lives in a different country and uses Alice's email address for basic communication. For secure communication, SecureBank requires that messages be encrypted. However, Alice does not have an encryption key, and given with wait times and time zone difference, it is very inconvenient for Alice to set the encryption key (or password) by phone. It would be very beneficial if SecureBank were to have a way to use Alice's photograph, and depend on a trustworthy face recognition client subsystem at Alice's end to send the encryption key. Additionally, if there were an ability to transparently comply with policy conditions associated e.g., user presence and confirmation of viewing (e.g., associated with certain legal documents), user experience and secure usage of the services may be enhanced. Through use of an embodiment such as the system 100 of FIG. 1, a burden of complexity for authentication may be shifted from a user to a trustworthy client subsystem.

In another example that involves preservation of privacy in a person-to-person social networking context, consider Bob, who knows Cathy from a meeting (e.g., an addiction support group meeting). Bob and Cathy have photographs and non-identifying email addresses of each other. Bob may want to send Cathy a private message that is to be viewed by only Cathy. Bob and Cathy may also wish to talk via secure chat session, which requires that chat messages appear on a trusted output display and also requires that each chat message is to appear only when the recipient is present, e.g., in front of a viewer screen. If Bob can depend on a trustworthy client system at Cathy's end to verify Cathy's face (e.g., via use of a photograph of Cathy supplied by Bob) and deliver the message securely to Cathy, then person-to-person private messaging is feasible with no complex user interaction and/or key exchange.

The client system would be responsible to verify Cathy's face using face recognition systems via comparison against Cathy's photograph, and then to enforce policies for access to the message (e.g. decrypt only when user is viewing the screen). Through use of an embodiment such as the system 100 of FIG. 1, the above-described scenario for person-to-person private messaging may be realized.

Figure 2:
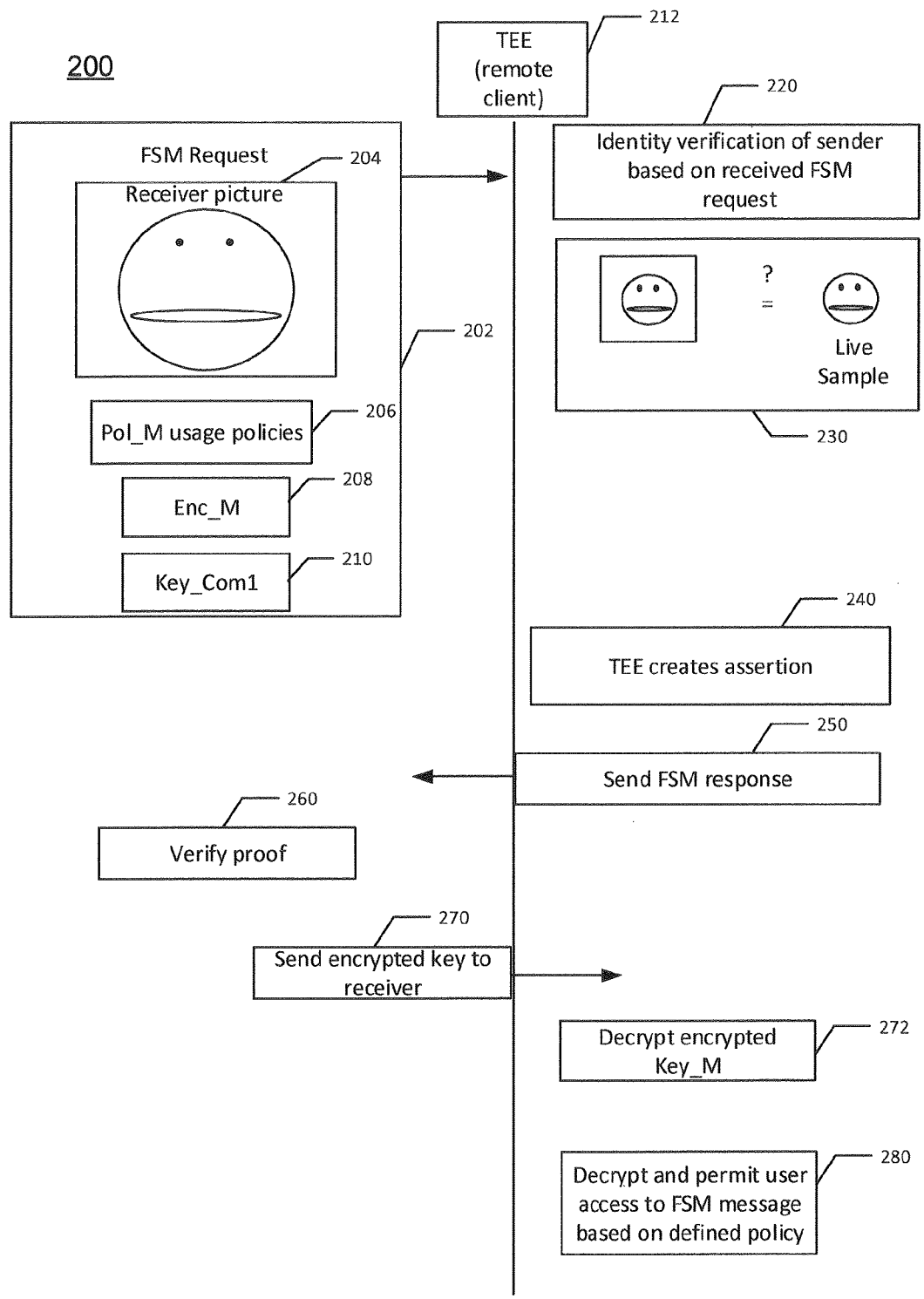
FIG. 2 is a block diagram showing a flow of information between a sender and a receiver having a trusted execution environment, according to embodiments of the present invention.

FIG. 2 is a block diagram 200 showing a flow of information between a sender and a receiver having a trusted execution environment (TEE), according to embodiments of the present invention. An FSM request 202 is to be sent from a sender to a receiver (remote client). The FSM request 202 includes an encoded message Enc_M 208 (encoded with a private key, Key_M), a receiver picture 204 such as a photograph of a user of the receiver (e.g., previously stored photographic data including photographic information), sender-defined usage policies (Pol_M) 206, and a public key of the sender (Key_Com1) 210.

The receiver implements a TEE 212 that is a secure environment within the receiver. Within the TEE 212, at block 220 the receiver verifies an identity of the user based on the received FSM request 202. The user identity may be verified based on multi-factor analysis (MFA) of user data such as fingerprint, voice print, various other biometric data, etc.

As part of identity verification, the receiver conducts a comparison 230 of the receiver picture 204 to a live sample (e.g., streamed video data of a user) provided through use of a camera (not shown) that is coupled to the TEE 212 via a secure video data path. The comparison may be conducted according to sender-defined policies, e.g., specifying a percentage match of various facial biometric measures of the picture 204 to the live sample video. A match may be established, which supports an authentication of the user.

The TEE 212 creates an authentication assertion 240 that includes an attestation of user authentication (e.g., based on the match of the picture and the live sample video and the MFA), which may include attestation of the TEE, and a proof of compliance with the sender-defined policy.

The TEE encrypts the authentication assertion 240 with Key_Com1 (public key of the sender) to produce an FSM response 250 and sends the FSM response 250 plus Key_Com2 (public key of the receiver) from the receiver to the sender.

The sender decrypts the authentication assertion and verifies the attestation of user authentication and proof of compliance at 260 (e.g., through a trusted attestation service). After completion of the verification 260, the sender encrypts the Key_M (private key of the sender used to encrypt the message) with Key_Com2 (the public key of the receiver), and sends the encrypted key_M to the receiver at block 270. The receiver decrypts the encrypted key_M (block 272), uses the key_M to decrypt the message, and permits the user to access the decrypted message M according to the sender-defined use policy (block 280).

In some embodiments, a technology such as an enhanced privacy identification (EPID)-based key exchange protocol (e.g., Intel Sigma C), or a simple mail transfer protocol (SMTP), or Internet message access protocol (IMAP)) can be used to implement one or more of creation of identity attestation, proof of compliance with sender-defined policy (e.g., secure container/TEE), encryption of the assertion, sending the FSM response to the sender, encryption of Key_M with Key_Com2 and sending to the FSM application, and decrypting the message Enc_M through use of Key_M.

In some embodiments, the sender-defined policy can include a single instance of establishment of trust that enables use of the same private encryption key to access multiple messages, thus avoiding multiple attestation instances.

In other embodiments, the above-described attestation protocol may be implemented in a bi-directional fashion to verify authenticity of the sender as well as well as the receiver. In such embodiments, the sender may need to prove that the sender has provided the picture that has been made available to the receiver.

Figure 3:
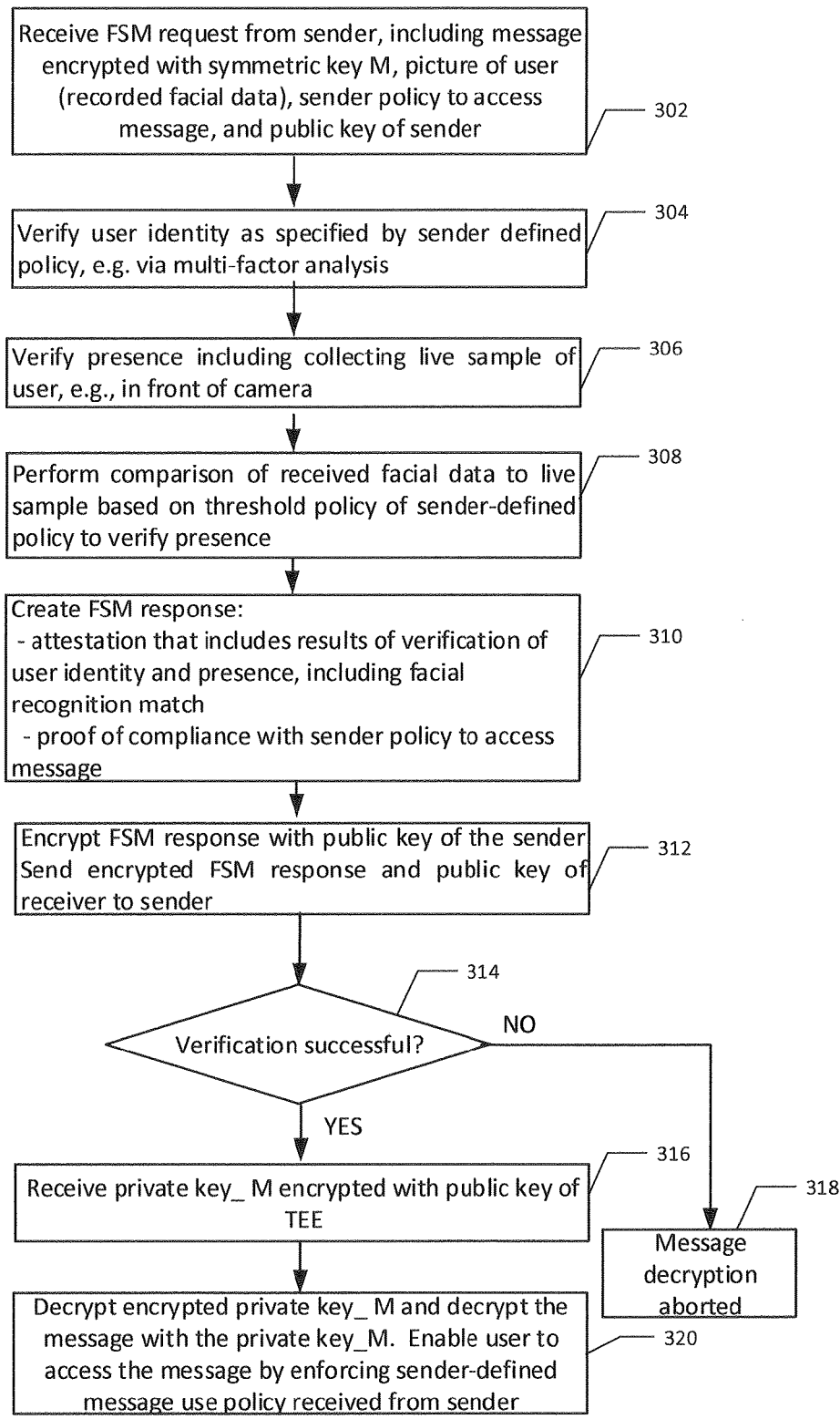
FIG. 3 is a flowchart of a method of accessing an encrypted message at a receiver, according to embodiments of the present invention.

FIG. 3 is a flowchart of a method 300 of accessing an encrypted message at a receiver, according to embodiments of the present invention. At block 302, the receiver (e.g., in a trusted execution environment, TEE) receives from a sender an FSM request that includes a picture (e.g., stored visual data such as photographic data, photographic information, etc.), sender policy to access a message, an encrypted message that is encrypted with a private (e.g., symmetric) key M, and a public key of the sender. Continuing to block 304, the TEE begins verification of a user identity of the receiver and a presence of the user, as specified by a sender-defined policy. The verification may include a multi-factor analysis MFA (e.g., based on measured biometrics of the user). Advancing to block 306, as part of verification of the presence of the user, a live video data sample (e.g., captured streamed video data) of the user is collected (e.g., in front of a video camera). Moving to block 308, a comparison of facial data (e.g., extracted from the received picture) to the live video sample data is performed in the TEE. The comparison may be conducted based on a match threshold policy of the sender-defined policy (e.g., percentage match of a set of characteristics of the received picture to the captured video data sample).

Proceeding to block 310, an FSM response is created and includes an attestation including results of verification of user identity and presence (including facial recognition match data). The FSM response may also include proof of compliance of the TEE with the sender-defined policy for message access. Continuing to block 312, the FSM response is encrypted with the public key of the sender and is sent to the sender, along with a public key of the receiver.

Advancing to decision diamond 314, if the verification of the FSM response received by the sender from the receiver is successful (e.g., verification of facial recognition, recognition based on MFA analysis, and proof of compliance with sender-defined policies including message access policy, etc.), moving to block 316 the receiver receives from the sender an encrypted private key M (e.g., a symmetric key) encrypted with the public key of the receiver TEE. Proceeding to block 320, the TEE decrypts the private key M, uses the private key M to decrypt the message, and enables access by the user to the message while enforcing the sender-defined message access policy received from the sender. Back at decision diamond 314, if the verification by the sender is not successful, moving to block 318 the private key M is not received by the receiver and the message decryption is aborted.

Figure 4:
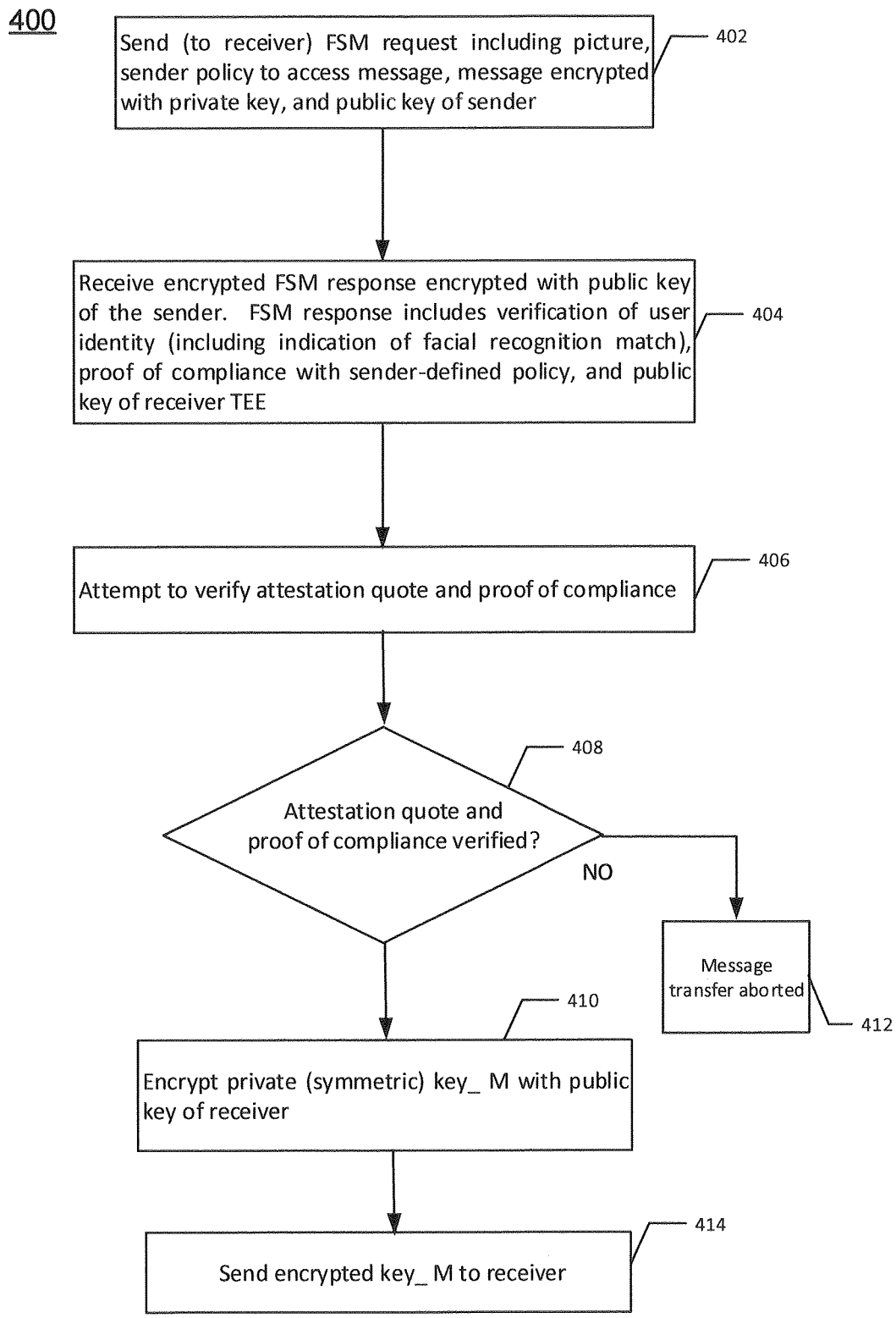
FIG. 4 is a flow chart of a method of providing an encrypted message by a sender, according to embodiments of the present invention.

FIG. 4 is a flow chart of a method 400 of providing an encrypted message by a sender, according to embodiments of the present invention. At block 402, the sender sends to a receiver an FSM request including a message encrypted with a private key M (e.g., symmetric key), a picture (e.g., previously recorded visual data or other photographic information, such as facial image data of a user), a sender-defined policy to access a message, and a public key of the sender. Continuing to block 404, the sender receives from the receiver a public key of the receiver TEE and an encrypted FSM response that is encrypted with the public key of the sender. The FSM response includes an attestation quote (e.g., Quote_Rec) including results of a facial match comparison of the picture to live video (e.g., streamed video data, such as facial image data of the user), and proof of compliance with the sender-defined policy for receiver access to the message (e.g., ZKProof_Rec), along with a public key of the receiver TEE (Key_Com2).

Advancing to block 406, the sender attempts to verify the attestation quote and the proof of compliance with the sender-defined message access policy. Moving to decision diamond 408, if the attestation quote and the proof of compliance are verified, moving to block 410 the sender encrypts private key_M with the public key of the receiver Key_Com2, and proceeding to block 414 the encrypted private key_M is sent to the receiver, enabling the TEE to decrypt the encrypted private key_M and subsequently to decrypt the encrypted message and enable the message to be read by the user according to the sender-defined message access policy.

Back at decision diamond 408, if one (or both) of the attestation quote and the proof of compliance with the sender-defined message access policy is not verified, the private key_M is not sent to the receiver, and advancing to block 414 the message transfer is aborted.

Systems such as the systems described above may be used to provide person-to-person face-based secure messaging based on platform attestation and hardware based user identity and presence detection, in embodiments of the present invention. In particular, embodiments of the present invention may include one or more of FSM usage, use of TEE for face template collection, and "liveness" detection (e.g., presence determination by comparison of streamed video data to a received photograph), privacy enhanced message policy enforcement, trusted path connections from a TEE to a camera device, creation of a message authentication key from a face template using a standard photograph image format (e.g., jpg, tiff, pdf, bmp etc. . . . ), etc.

Figure 5:
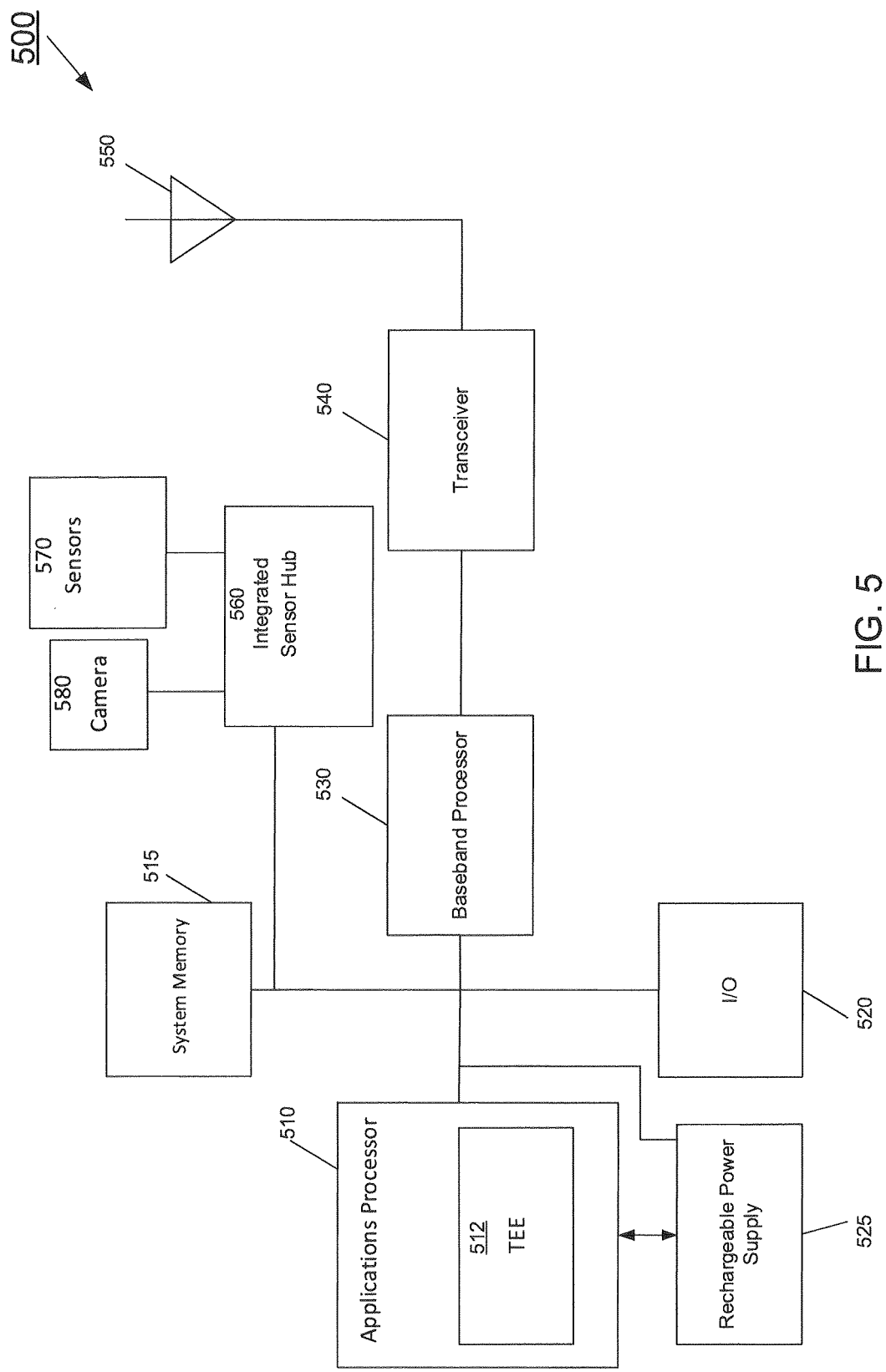
FIG. 5 is a block diagram of a mobile device system in accordance with an embodiment of the present invention.

Embodiments can be incorporated into other types of systems including mobile devices such as a cellular telephone. Referring now to FIG. 5, shown is a block diagram of a mobile device system in accordance with another embodiment of the present invention. As shown in FIG. 5, system 500 may be a mobile device and may include various components. As shown in the high level view of FIG. 5, an applications processor 510, which may be a central processing unit of the device, is in communication with various components, including a system memory 515. System memory 515, in various embodiments, may include both program and data storage portions and can be mapped to provide for secure storage to be used in a trusted execution environment (TEE), according to embodiments of the present invention.

The applications processor 510 may be configured to execute, in a TEE that includes TEE portion 512, a face based secure messaging (FSM) application that collects live video facial data, e.g., of a user, and conducts a comparison to a received picture of the user (e.g., stored photographic data or other photographic information), according to embodiments of the present invention. In response to an FSM request (including an encrypted message, sender-defined policy to access the message, picture, and a public key of a sender such as a server, another cell phone, or another source) received from the sender, the FSM application may send an FSM response that includes a receiver attestation quote including results of the comparison of the video data and picture data and a proof of compliance of the sender-defined policy, according to embodiments of the present invention. Upon verification of the FSM response by the sender, the TEE portion 512 may receive an encoded private key from the sender, the TEE portion 512 may decrypt the encoded private key, and after decryption, the TEE portion 512 may decrypt the encrypted message using the private key and enable the user to access the decrypted message according to the sender-defined policy for access to the message, according to embodiments of the present invention.

Applications processor 510 may further be coupled to an input/output system 520, which in various embodiments may include a display and one or more input devices such as a touch keypad, which itself can appear on the display when executed. The system 500 may also include an integrated sensor hub (ISH) 560 that may receive data from one or more sensors 570 and from a video camera 580 that is to provide the video data via a secure path to the TEE, according to embodiments of the present invention.

Applications processor 510 also may couple to a baseband processor 530, which may condition signals such as voice and data communications for output, as well as conditioning incoming telephone and other signals. As seen, baseband processor 530 couples to a transceiver 540, which may enable both receive and transmit capabilities. In turn, transceiver 540 may be in communication with an antenna 550, e.g., any type of antenna capable of transmitting and receiving voice and data signals via one or more communication protocols such as via a wireless wide area network (e.g., a 3G or 4G network) and/or a wireless local area network, such as a BLUETOOTH™ or so-called WI-FI™ network in accordance with an Institute of Electrical and Electronics Engineers 802.11 standard. As seen, system 500 may further include a rechargeable power supply 525 having a rechargeable battery to enable operation in a mobile environment. While shown with this particular implementation in the embodiment of FIG. 5, the scope of the present invention is not limited in this regard.

Figure 6:
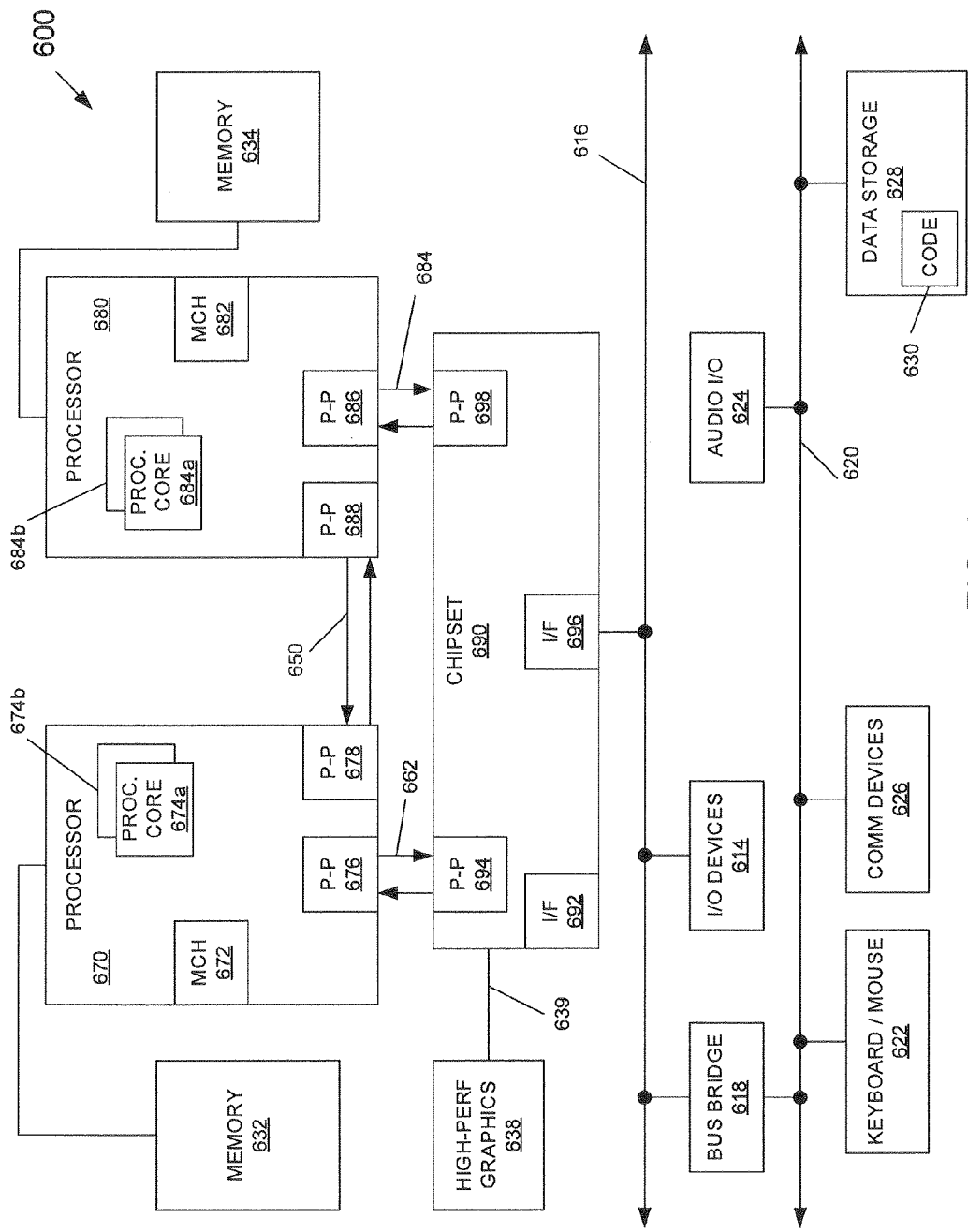
FIG. 6 is a block diagram of a system in accordance with an embodiment of the present invention.

Embodiments may be implemented in many different system types. Referring now to FIG. 6, shown is a block diagram of a system in accordance with an embodiment of the present invention. As shown in FIG. 6, multiprocessor system 600 is a point-to-point interconnect system, and includes a first processor 670 and a second processor 680 coupled via a point-to-point interconnect 650. As shown in FIG. 6, each of processors 670 and 680 may be multicore processors, including first and second processor cores (i.e., processor cores 674a and 674b and processor cores 684a and 684b), although potentially many more cores may be present in the processors. Portions of one or both of the processors 670, 680 may be included a trusted execution environment (TEE) and the TEE may be configured to execute a face based secure messaging (FSM) application that collects live video facial data and conducts a comparison to a received picture (e.g., stored visual data, photographic information, etc.), according to embodiments of the present invention. In response to an FSM request (received from a sender) that includes an encrypted message, a sender-defined access policy to access the message, a picture, and a public key of a sender, the FSM application executed in the TEE may send to the sender an FSM response that includes a receiver attestation quote, including results of a comparison of the video data and picture data, and a proof of compliance of the system 600 with the sender defined message access policy, according to embodiments of the present invention. Responsive to verification by the sender of the attestation quote and the proof of compliance, the TEE of the system 600 may receive an encrypted decryption key that can be decrypted and used to decrypt the encrypted message. The TEE of the system 600 may enable the user to access the decrypted message in accordance with the sender-defined message access policy, according to embodiments of the present invention.

Still referring to FIG. 6, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 6, MCHs 672 and 682 couple the processors to respective memories, namely a memory 632 and a memory 634, which may be portions of system memory (e.g., DRAM) locally attached to the respective processors. The memory 632 and the memory 634 may include a TEE portion. First processor 670 and second processor 680 may be coupled to a chipset 690 via P-P interconnects 662 and 684, respectively. As shown in FIG. 6, chipset 690 includes P-P interfaces 694 and 698.

Furthermore, chipset 690 includes an interface 692 to couple chipset 690 with a high performance graphics engine 638 via a P-P interconnect 639. In turn, chipset 690 may be coupled to a first bus 616 via an interface 696. As shown in FIG. 6, various input/output (I/O) devices 614 may be coupled to first bus 616, along with a bus bridge 618, which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio input/output (I/O) 624 may be coupled to second bus 620. Embodiments can be incorporated into other types of systems including mobile devices such as a smart cellular telephone, tablet computer, netbook, Ultrabook™, or so forth.

Figure 7:
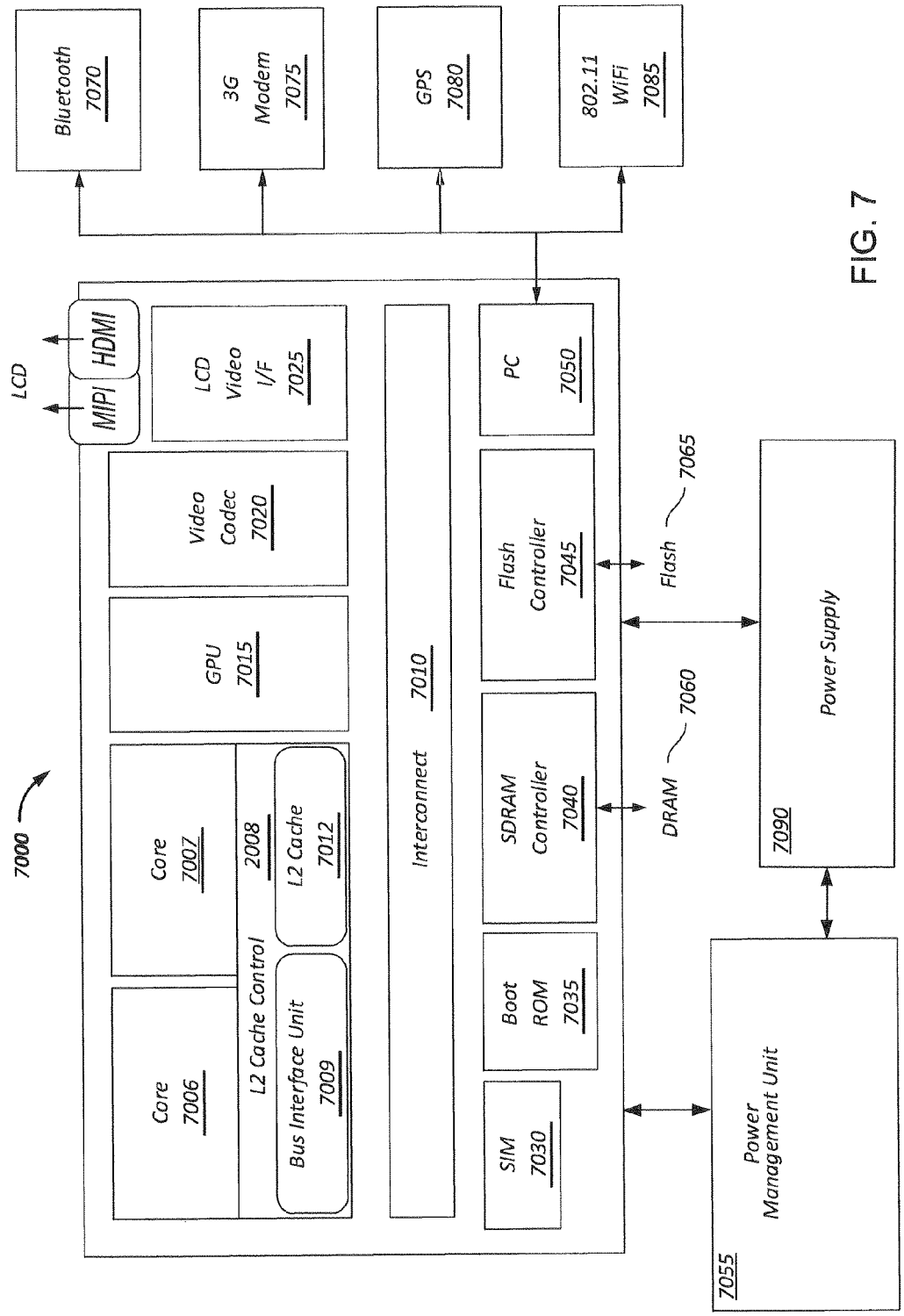
FIG. 7 is a block diagram of a system on a chip (SoC) design in accordance with an embodiment of the present invention.

FIG. 7 is a block diagram of a system on a chip (SoC) design in accordance with an embodiment of the present invention. As a specific illustrative example, SoC 7000 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SoC 7000 includes two cores—7006 and 7007. Cores 7006 and 7007 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 7006 and 7007 are coupled to cache control 7008 that is associated with bus interface unit 7009 and L2 cache 7012 to communicate with other parts of system 7000.

The system 7000 may include a trusted execution environment (TEE) and may be configured to execute, in the TEE, a face based secure messaging (FSM) application that collects live video facial data and conducts a comparison to a received picture of a user (e.g., stored visual data, photographic information, etc.), according to embodiments of the present invention. In response to an FSM request (including an encrypted message, sender-defined policy to access the message, the picture, and a public key of a sender) received from a sender, the FSM application executed in the TEE may send an FSM response that includes a receiver attestation quote that includes results of the comparison of the video data and picture data and a proof of compliance of the sender-defined policy, according to embodiments of the present invention. Responsive to verification by the sender of the attestation quote and the proof of compliance, the TEE of the SoC 7000 may receive an encrypted private key, decrypt the private key, decrypt the encrypted message using the private key, and enable access by a user to the message according to the sender-defined access policy, in accordance with embodiments of the present invention.

Interconnect 7010 includes an on-chip interconnect such as on-chip system fabric (IOSF) or advanced microcontroller bus architecture (AMBA). Interconnect 7010 provides communication channels to other components, such as a Subscriber Identity Module (SIM) 7030 to interface with a subscriber identity module (SIM) card, a boot read only memory (ROM) 7035 to hold boot code for execution by cores 7006 and 7007 to initialize and boot SOC 7000, a synchronous dynamic random access memory (SDRAM) controller 7040 to interface with external memory (e.g. dynamic random access memory (DRAM) 7060), a flash controller 7045 to interface with non-volatile memory (e.g. Flash 7065), a peripheral controller 7050 (e.g. serial peripheral interface) to interface with peripherals, video codecs 7020 and video interface 7025 to display and receive input (e.g. touch enabled input), graphics processing unit (GPU) 7015 to perform graphics related computations, etc. Power management unit (PMU) 7055 determines power to be provided by a power supply 7090 to each of the modules of the SOC 7000 including power to cores 7006, 7007, and GPU 7015.

In addition, the system illustrates peripherals for communication, such as a Bluetooth module 7070, 3G modem 7075, GPS 7080, and WiFi 7085. Note as stated above, a UE includes a radio for communication. As a result, these peripheral communication modules are not all required. However, in a UE some form of radio for external communication may be included.

Additional embodiments are described below.

In a first example, a system includes at least one core and a trusted execution environment (TEE) to conduct an identity authentication that includes a comparison of streamed video data with previously recorded image data. The TEE is further to, responsive to establishment of a match of the streamed video data to the previously recorded image data via the comparison, generate an identity attestation that indicates the match.

In a second example that includes the elements of the first example, prior to conducting the comparison the TEE is to receive, from a sender, a face based secure messaging (FSM) request that includes the previously recorded image data and an encrypted message that includes a message that is encrypted via a private key.

In a third example that includes the elements of the second example, the FSM request includes a public key of the sender.

In a fourth example that includes the elements of the third example, the TEE is to encrypt the identity attestation with the public key of the sender to form an encrypted identity attestation and to provide an FSM response to the sender that includes the encrypted identity attestation and that also includes a public key of the system.

In a fifth example that incorporates the elements of the fourth example, responsive to verification of the FSM response by the sender including verification of the identity attestation, the TEE is to receive an encrypted private key that includes the private key encrypted with the public key of the system.

In a sixth example that incorporates the elements of the fifth example, the FSM request includes a sender-defined policy for message access, and verification of the FSM response by the sender further includes verification of compliance by the TEE of the sender-defined policy for message access.

In a seventh example that incorporates the elements of the sixth example, the sender-defined policy specifies a temporal access restriction to the message.

In an eighth example that incorporates the elements of the sixth example, the sender-defined policy specifies that the streamed video data and the previously recorded image satisfy at least one match threshold to establish the match.

In a ninth example that optionally incorporates the elements of any one of the $5^{th}$ through the $8^{th}$ examples, after receipt of the encrypted private key the TEE is to decode the encrypted private key and the TEE is to decrypt the encrypted message using the private key.

In a tenth example, at least one computer readable medium has instructions stored thereon for causing a system to conduct a comparison of streamed video information to photographic information in a trusted execution environment (TEE) of the receiver responsive to receipt from a sender of a face-based secure messaging (FSM) request that includes the photographic information and an encrypted message that includes a message encrypted via a private key. The instructions stored further cause a system to formulate and send to the sender an FSM response that includes an authentication attestation, where the authentication attestation includes a result of the comparison, and responsive to verification by the sender of the authentication attestation, to receive an encrypted private key, decrypt the encrypted private key to obtain the private key, and to decrypt the encrypted message using the private key.

In an $11^{th}$ example that includes the elements of the tenth example, the instructions to formulate and send to the sender the FSM response include instructions to include in the FSM response an indication of compliance by the TEE of a sender-defined policy associated with message access.

A $12^{th}$ example that includes the elements of the eleventh example further includes instructions to, responsive to verification by the sender of the authentication attestation, enable a user to access the message according to a temporal restriction specified by the sender-defined policy.

In a $13^{th}$ example that includes the elements of the tenth example, the instructions to formulate and send to the sender the FSM response include instructions to include, in the authentication attestation, an authentication of multi-factor data associated with a user, where the multi-factor data is distinct from the streamed video information.

In a $14^{th}$ example that includes the elements of the $13^{th}$ example, the instructions to include, in the authentication attestation, the authentication of multi-factor data of the user include instructions to include an indication of authentication of voiceprint data associated with the user.

In a $15^{th}$ example that includes the elements of the $13^{th}$ example, the instructions to include, in the authentication attestation, the authentication of multi-factor data of the user include instructions to include an indication of authentication of fingerprint data of the user.

In a $16^{th}$ example that includes the elements of any one of the $10^{th}$ through the $15^{th}$ examples, the instructions to conduct the comparison include instructions to determine whether the streamed video information matches the photographic information according to a sender-defined match threshold.

In a $17^{th}$ example, a method includes conducting, by a receiver, a comparison of streamed video information to photographic information in a trusted execution environment (TEE) of the receiver responsive to receipt from a sender of a face-based secure messaging (FSM) request that includes the photographic information and an encrypted message that includes a message encrypted via a private key. The method also includes sending an FSM response to the sender that includes an authentication attestation that includes a result of the comparison, and responsive to verification of the authentication attestation by the sender, receiving an encrypted private key, decrypting the encrypted private key to obtain the private key, and decrypting the encrypted message using the private key.

In an 18$^{th}$ example that includes the elements of the 17$^{th}$ example, the FSM request includes a sender-defined policy for message access, and the authentication attestation includes an indication of compliance by the receiver of the sender-defined policy.

In an 19$^{th}$ example that includes the elements of the 18$^{th}$ example, the method includes permitting, by the receiver, access to the message by a user according to the sender-defined policy for message access.

In a 20$^{th}$ example that includes the elements of the 17$^{th}$ example, the method includes receiving the streamed video information via a secure path from a video capture device that is external to the TEE.

In a 21$^{th}$ example, an apparatus includes means for performing the method of any one of the 17$^{th}$ to the 20$^{th}$ examples.

A 22$^{nd}$ example is an apparatus to perform the method of any one of the 17$^{th}$ to 20$^{th}$ examples.

A 23$^{rd}$ example is a system including at least one core and a trusted execution environment (TEE). The TEE includes authentication means for conducting an identity authentication that includes a comparison of streamed video data with previously recorded image data, and identity attestation means for generating an identity attestation that indicates the match responsive to establishment of a match of the streamed video data to the previously recorded image data via the comparison.

A 24$^{th}$ example includes the elements of the 23$^{rd}$ example, where prior to conducting the comparison, the TEE is to receive, from a sender, a face based secure messaging (FSM) request that includes the previously recorded image data and an encrypted message that includes a message that is encrypted via a private key.

In a 25$^{th}$ example that includes the elements of the 24$^{th}$ example, the FSM request includes a public key of the sender.

In a 26$^{th}$ example that includes the elements of the 25$^{th}$ example, the TEE further includes encryption means for encrypting the identity attestation with the public key of the sender to form an encrypted identity attestation. The TEE also includes response means for providing an FSM response to the sender that includes the encrypted identity attestation and that also includes a public key of the system.

In a 27$^{th}$ example that includes the elements of the 26$^{th}$ example, responsive to verification of the FSM response by the sender including verification of the identity attestation, the TEE is to receive an encrypted private key that includes the private key encrypted with the public key of the system.

In a 28$^{th}$ example that includes the elements of the 27$^{th}$ example, the FSM request includes a sender-defined policy for message access, and verification of the FSM response by the sender further includes verification of compliance by the TEE of the sender-defined policy for message access.

In a 29$^{th}$ example that includes the elements of the 28$^{th}$ example, the sender-defined policy specifies a temporal access restriction to the message.

In a 30$^{th}$ example that includes the elements of the 28$^{th}$ example, the sender-defined policy specifies that the streamed video data and the previously recorded image satisfy at least one match threshold to establish the match.

In a 31$^{th}$ example that includes the elements of any one of the 27$^{th}$ to 30$^{th}$ examples, the TEE further includes decoding means for decoding the encrypted private key, and decrypting means for decrypting the encrypted message using the private key.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
   at least one hardware processor core; and
   a trusted execution environment (TEE) including secure hardware to:
   conduct an identity authentication that includes a comparison of streamed video data with previously recorded image data received from a sender in a face based secure messaging (FSM) request that includes the previously recorded image data, an encrypted message comprising a private message that is encrypted via a private key, a public key of the sender and a sender-defined policy for message access;
   responsive to establishment of a match of the streamed video data to the previously recorded image data via the comparison and according to the sender-defined policy, generate an identity attestation that indicates the match and verifies an identity of a user of the system;
   encrypt the identity attestation with the public key of the sender to form an encrypted identity attestation and provide an FSM response to the sender including the encrypted identity attestation and a public key of the system; and receive an encrypted private key that includes the private key encrypted with the public key of the system, decode the encrypted private key and decrypt the encrypted message using the private key to enable the user to access the private message.

2. The system of claim 1, wherein responsive to verification of the FSM response by the sender including verification of the identity attestation, the TEE is to receive the encrypted private key.

3. The system of claim 2, wherein verification of the FSM response by the sender further includes verification of compliance by the TEE of the sender-defined policy for message access.

4. The system of claim 3, wherein the sender-defined policy specifies a temporal access restriction to the message.

5. The system of claim 3, wherein the sender-defined policy specifies that the streamed video data and the previously recorded image satisfy at least one match threshold to establish the match.

6. At least one non-transitory computer readable medium comprising instructions stored thereon for causing a system to:
conduct a comparison of streamed video information to photographic information in a trusted execution environment (TEE) including secure hardware of the system responsive to receipt from a sender of a face-based secure messaging (FSM) request that includes the photographic information and an encrypted message comprising a private message encrypted via a private key, a public key of the sender and a sender-defined policy for message access;
formulate and send to the sender an FSM response that includes an authentication attestation encrypted with the public key of the sender and an indication of compliance by the TEE of the sender-defined policy, wherein the authentication attestation includes a result of the comparison, the FSM response further comprising a public key of the system; and
responsive to verification by the sender of the authentication attestation, receive an encrypted private key that includes the private key encrypted with the public key of the system, decrypt the encrypted private key to obtain the private key, and decrypt the encrypted message using the private key to enable the user to access the private message.

7. The at least one non-transitory computer readable medium of claim 6, further comprising instructions to, responsive to verification by the sender of the authentication attestation, enable access by the user to the private message according to a temporal restriction specified by the sender-defined policy.

8. The at least one non-transitory computer readable medium of claim 6, wherein the instructions to conduct the comparison include instructions to determine whether the streamed video information matches the photographic information according to a sender-defined match threshold.

9. The at least one non-transitory computer readable medium of claim 6, wherein the instructions to formulate and send to the sender the FSM response include instructions to include, in the authentication attestation, an authentication of multi-factor data associated with the user, wherein the multi-factor data is distinct from the streamed video information.

10. The at least one non-transitory computer readable medium of claim 9, wherein the instructions to include, in the authentication attestation, the authentication of multi-factor data associated with the user including an indication of authentication of voiceprint data associated with the user.

11. The at least one non-transitory computer readable medium of claim 9, wherein the instructions to include, in the authentication attestation, the authentication of multi-factor data of the user including an indication of authentication of fingerprint data of the user.

12. A method comprising:
conducting, by a receiver, a comparison of streamed video information to photographic information in a trusted execution environment (TEE) comprising secure hardware of the receiver responsive to receipt from a sender of a face-based secure messaging (FSM) request that includes the photographic information and an encrypted message comprising a private message encrypted via a private key, a public key of the sender and a sender-defined policy for message access;
sending an FSM response to the sender that includes a public key of the receiver and an authentication attestation, wherein the authentication attestation includes a result of the comparison according to the sender-defined policy and verifies an identity of a user of the receiver, the authentication attestation encrypted with the public key of the sender to form an encrypted authentication attestation; and
responsive to verification of the encrypted authentication attestation by the sender, receiving an encrypted private key that includes the private key encrypted with the public key of the receiver, decrypting the encrypted private key to obtain the private key, and decrypting the encrypted message using the private key to enable the user to access the private message.

13. The method of claim 12, further comprising permitting, by the receiver, the user to access the private message according to the sender-defined policy for message access.

14. The method of claim 12, further comprising receiving the streamed video information via a secure path from a video capture device that is external to the TEE.

* * * * *